United States Patent
Leung et al.

(10) Patent No.: US 9,268,361 B2
(45) Date of Patent: Feb. 23, 2016

(54) PORTABLE ELECTRICAL DEVICE

(71) Applicant: Quanta Computer Inc., Taoyuan Shien (TW)

(72) Inventors: Chee-Chun Leung, Taoyuan Shien (TW); Yuan-Chen Liang, Taoyuan Shien (TW); Chia-Hui Wu, Taoyuan Shien (TW); Yi-Chun Lin, Taoyuan Shien (TW); Yu-Shu Lin, Taoyuan Shien (TW); Kuan-Lin Su, Taoyuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 348 days.

(21) Appl. No.: 13/900,981

(22) Filed: May 23, 2013

(65) Prior Publication Data

US 2014/0118929 A1   May 1, 2014

(30) Foreign Application Priority Data

Oct. 31, 2012  (TW) .............................. 101221064 A

(51) Int. Cl.
*G06F 1/16* (2006.01)

(52) U.S. Cl.
CPC .............. *G06F 1/162* (2013.01); *G06F 1/1656* (2013.01); *G06F 1/1669* (2013.01)

(58) Field of Classification Search
CPC ... G06F 1/1669; G06F 1/1626; G06F 1/1654; G06F 1/1643; G06F 1/166; G06F 1/1616; G06F 1/162; G06F 1/1656; G06F 1/1667; G06F 1/169; G06F 1/189; G06F 1/16; G06F 1/1637; G06F 1/1679; G06F 1/1684

USPC ............. 361/679.01, 679.02, 679.08, 679.09, 361/679.21, 679.26, 679.27, 679.29, 361/679.41, 679.55–679.58; 248/917–924

See application file for complete search history.

(56) References Cited

U.S. PATENT DOCUMENTS

| | | | |
|---|---|---|---|
| 7,283,355 B2 * | 10/2007 | Han | 361/679.55 |
| 8,711,552 B2 * | 4/2014 | Medica et al. | 361/679.02 |
| 2003/0223185 A1 * | 12/2003 | Doczy et al. | 361/680 |
| 2011/0170252 A1 * | 7/2011 | Jones et al. | 361/679.09 |
| 2011/0242391 A1 * | 10/2011 | Senatori | 348/333.01 |

* cited by examiner

*Primary Examiner* — Anthony Haughton
*Assistant Examiner* — Ingrid Wright
(74) *Attorney, Agent, or Firm* — Rabin & Berdo, P.C.

(57) ABSTRACT

A portable electrical device includes a tablet PC, a bottom plate, a support arm and a pivot portion. The tablet PC includes a breach and a first magnetic inducing member arranged inside the breach. One end of the support arm is pivoted to the bottom plate, and the other end of the support arm is pivoted to the pivot portion, and the other end of the pivot portion is with a second magnetic inducing member. When the second magnetic inducing member is moved into the breach to magnetize the first magnetic inducing member, the tablet PC is securely coupled with the pivot portion so that the tablet PC can be rotated; on the contrary, when the second magnetic inducing member is removed from the breach, the tablet PC can be totally independent to the support arm and the bottom plate.

10 Claims, 11 Drawing Sheets

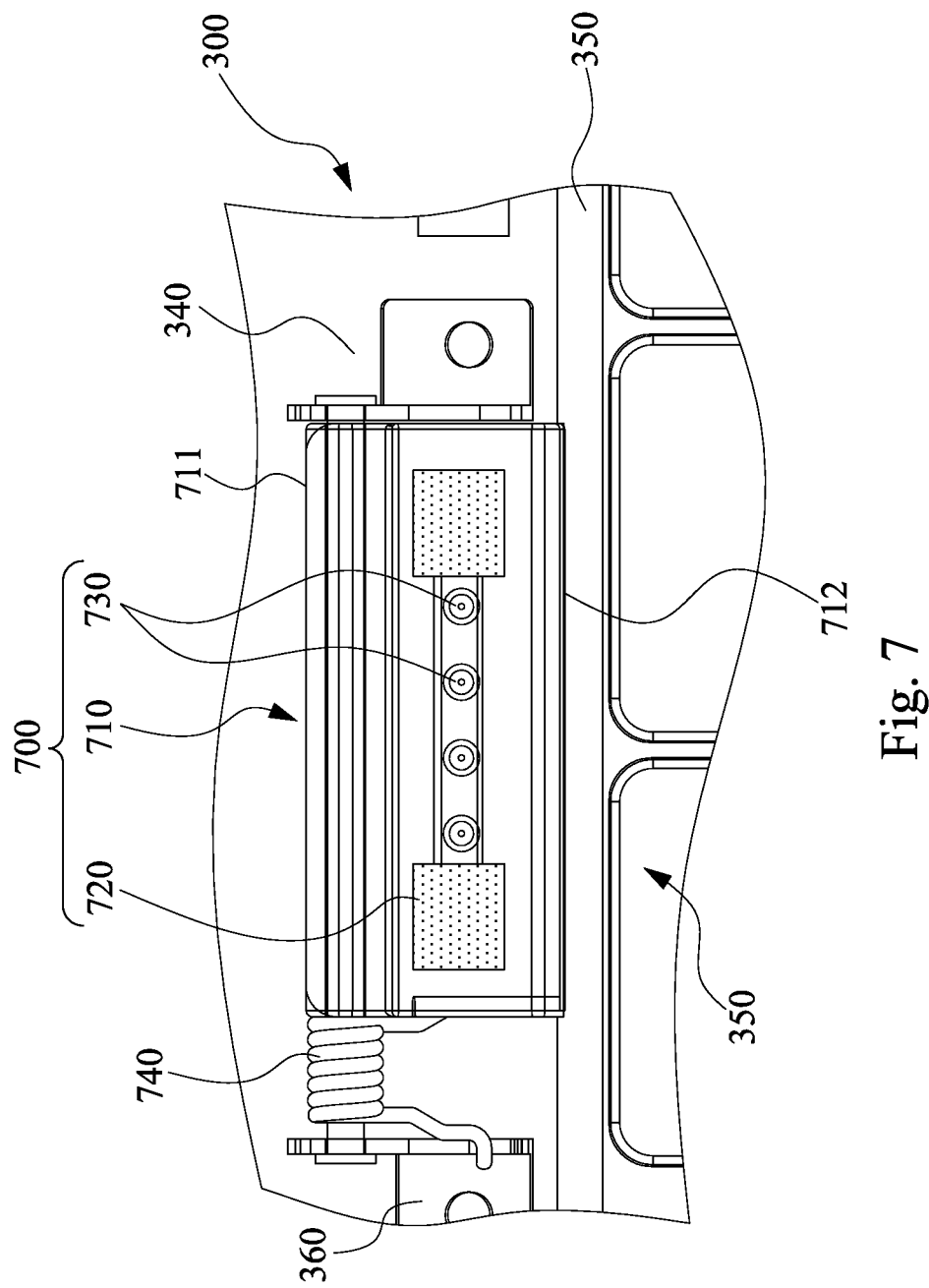

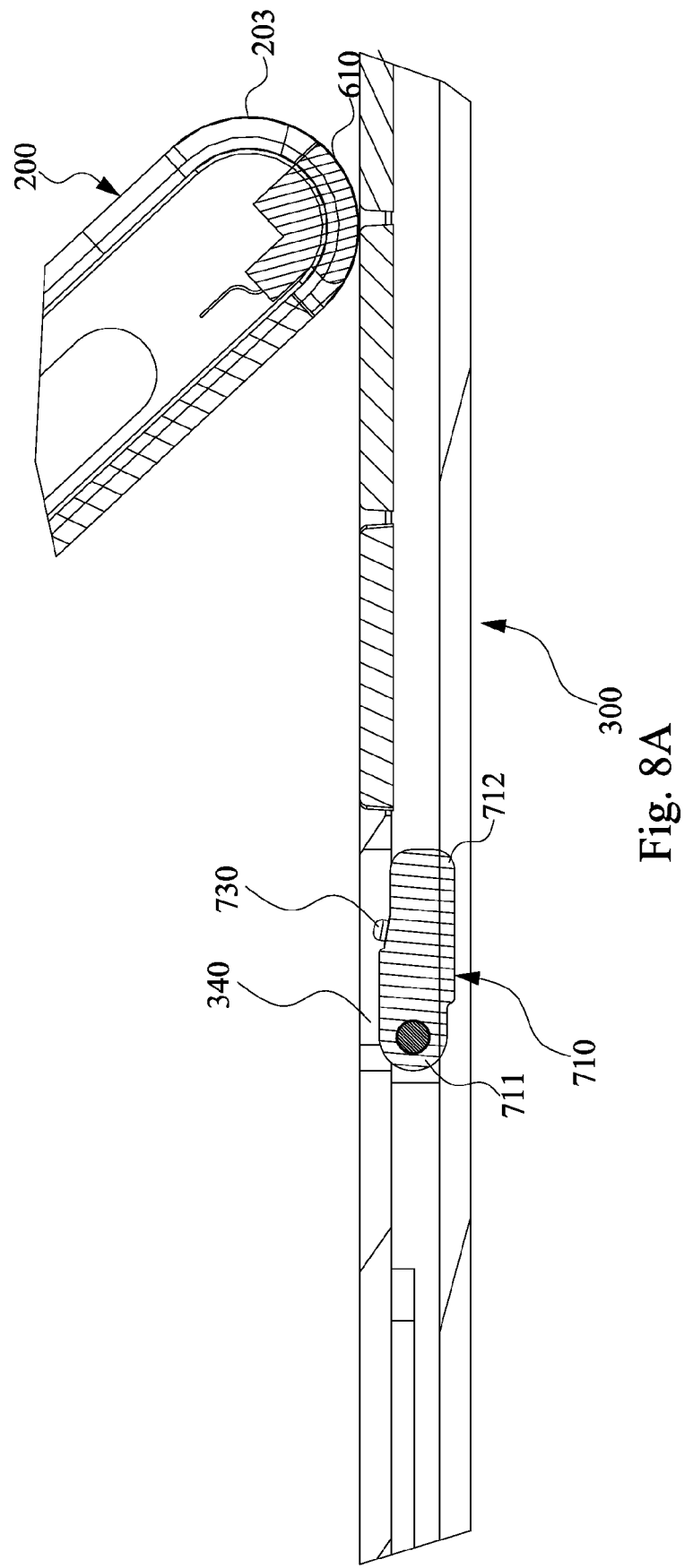

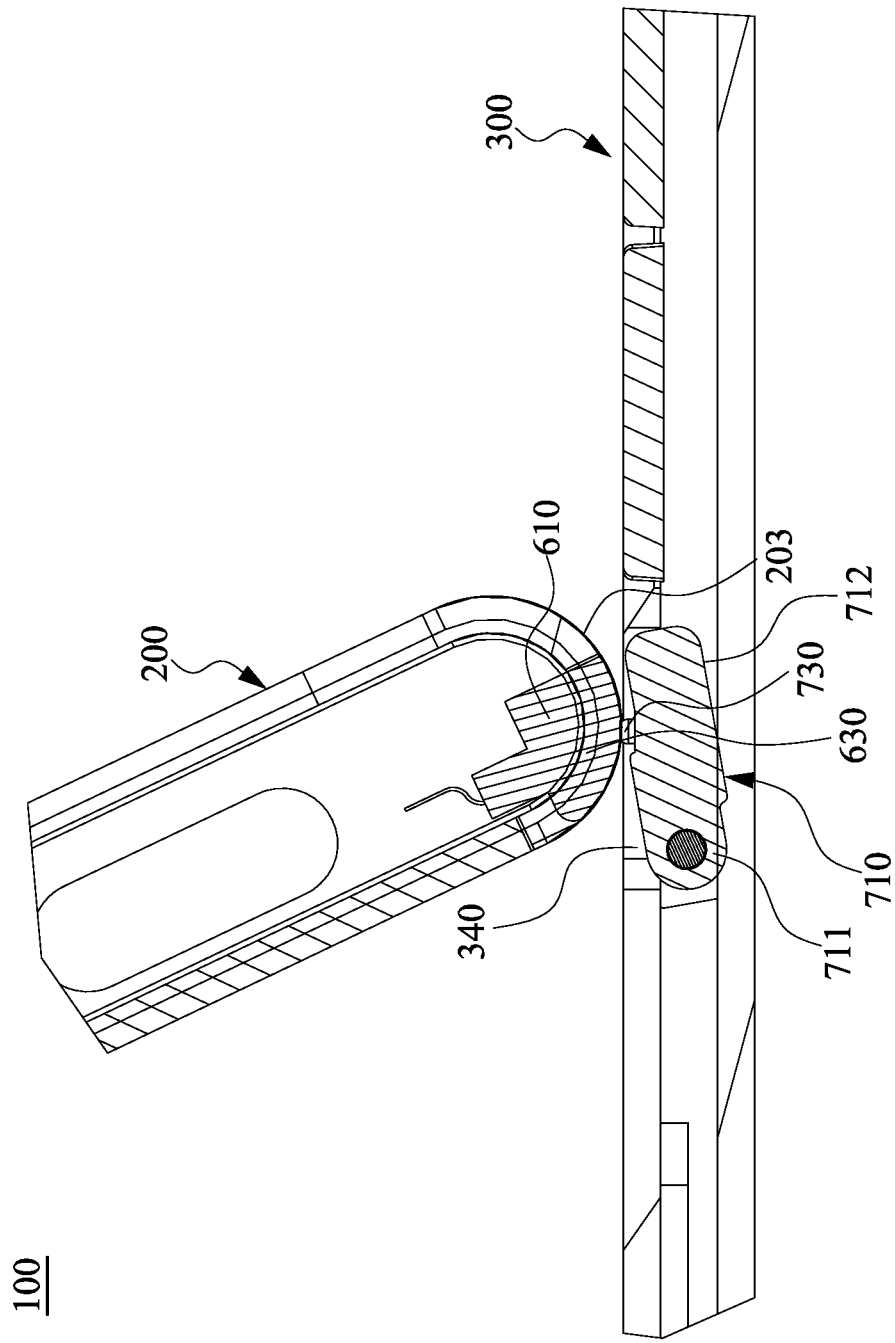

PORTABLE ELECTRICAL DEVICE

RELATED APPLICATIONS

This application claims priority to Taiwan Application Serial Number 101221064, filed Oct. 31, 2012, which is herein incorporated by reference.

BACKGROUND

1. Technical Field

The disclosure relates to a portable electrical product. More particularly, to the disclosure relates to a portable electrical device having a tablet PC and a keyboard device which are detachable.

2. Description of Related Art

A conventional tablet PC is tablet-shaped with features of thin appearance and portability. After users place the tablet PC flatly, the functions of touch input and handwriting input can be performed on a touch screen of the tablet PC. In addition, the tablet PC can be configured on a keyboard device by plugging, so that the tablet PC can be erected on one side of the keyboard device or the tablet PC can be removed from the keyboard device.

Moreover, in order to make users adjust a use angle between the touch screen and the keyboard device conveniently, the tablet PC is pivoted to the keyboard device by a support arm, so that the tablet PC can be pivoted for being closed or erected on the keyboard device, so that the users can use the keyboard device.

However, although the above-mentioned design can make the tablet PC be pivoted to the keyboard device, the advantage of independent use of the tablet PC is lost, which will influence users' using motivation and purchase desire.

Therefore, it is an urgent important subject to provide a design of a portable electrical product, which can meet the above-mentioned demands and make the manufacturer stand out in the competition of the industry.

SUMMARY

The disclosure provides a portable electrical device so that a tablet PC of the portable electrical device can be erected on a bottom plate of the portable electrical device after the tablet PC of the portable electrical device is pivoted to the bottom plate in relative to the tablet PC.

The disclosure provides a portable electrical device for a tablet PC of the portable electrical device to be separated from a bottom plate of the portable electrical device physically and totally.

According to an embodiment, the portable electrical device provided by the disclosure includes a tablet PC, a bottom plate, at least one support arm and at least one pivot portion. The tablet PC includes a computer system, a breach and at least one first magnetic inducing member arranged in the breach. The bottom plate includes an input interface. At least one support arm includes a first end and a second end opposite to each other. The first end is pivoted to the bottom plate. The pivot portion includes a third end and a fourth end opposite to each other. The third end is pivoted to the second end of the support arm and the fourth end is provided with a second magnetic inducing member.

Therefore, when the second magnetic inducing member is moved into the breach to magnetize the first magnetic inducing member, the tablet PC is securely coupled with the pivot portion so that the tablet PC can be rotated relative to the support arm; on the contrary, when the second magnetic inducing member is removed from the breach, the tablet PC can be totally independent to the support arm.

In view of the above, by the design of the portable electrical device of the disclosure, the portable electrical device can provide the advantage of the tablet PC which is pivoted to the bottom plate (such as a keyboard device) relatively and the advantage of the independent use of the tablet PC respectively so as to increase users' using motivation and purchase desire.

BRIEF DESCRIPTION OF THE DRAWINGS

In order to make the foregoing as well as other purposes, features, advantages and embodiments of the disclosure more apparent, the accompanying drawings are described as follows:

FIG. 7 illustrates an enlargement schematic view of the second connector module of the portable electrical device of the disclosure; and FIGS. 8A and 8B illustrate operational schematic views of the portable electrical device of the disclosure.

DETAILED DESCRIPTION

The spirit of the disclosure is described clearly below with reference to the drawings and detailed description. After those of skills in the art learn the preferred embodiments of the disclosure, variations and modifications can be made by the techniques taught in the disclosure without departing from the spirit and scope of the disclosure.

Figure 1:
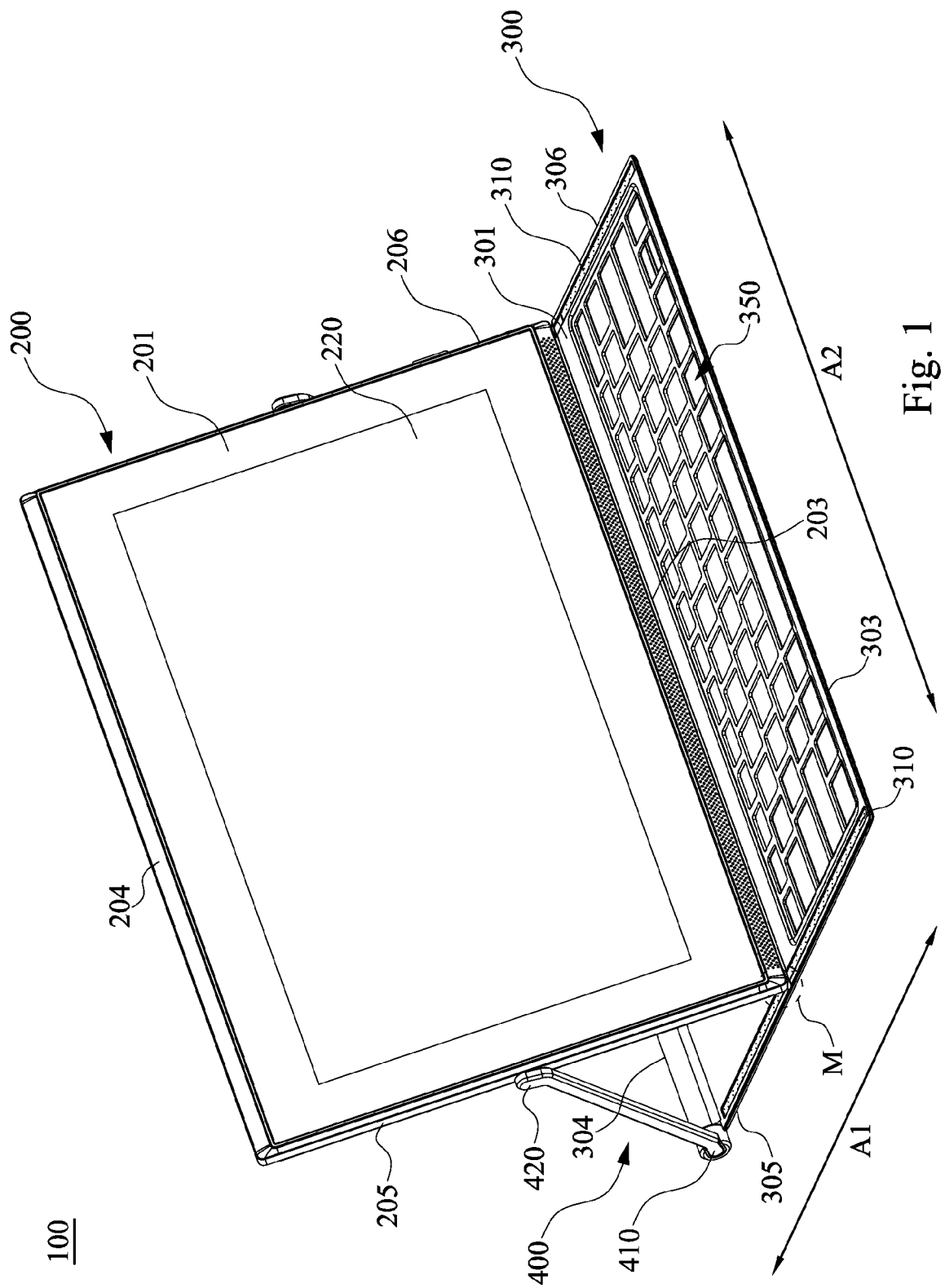
FIG. 1 illustrates a schematic view of the portable electrical device of the disclosure in an unfolding state according to an embodiment.
Figure 2:
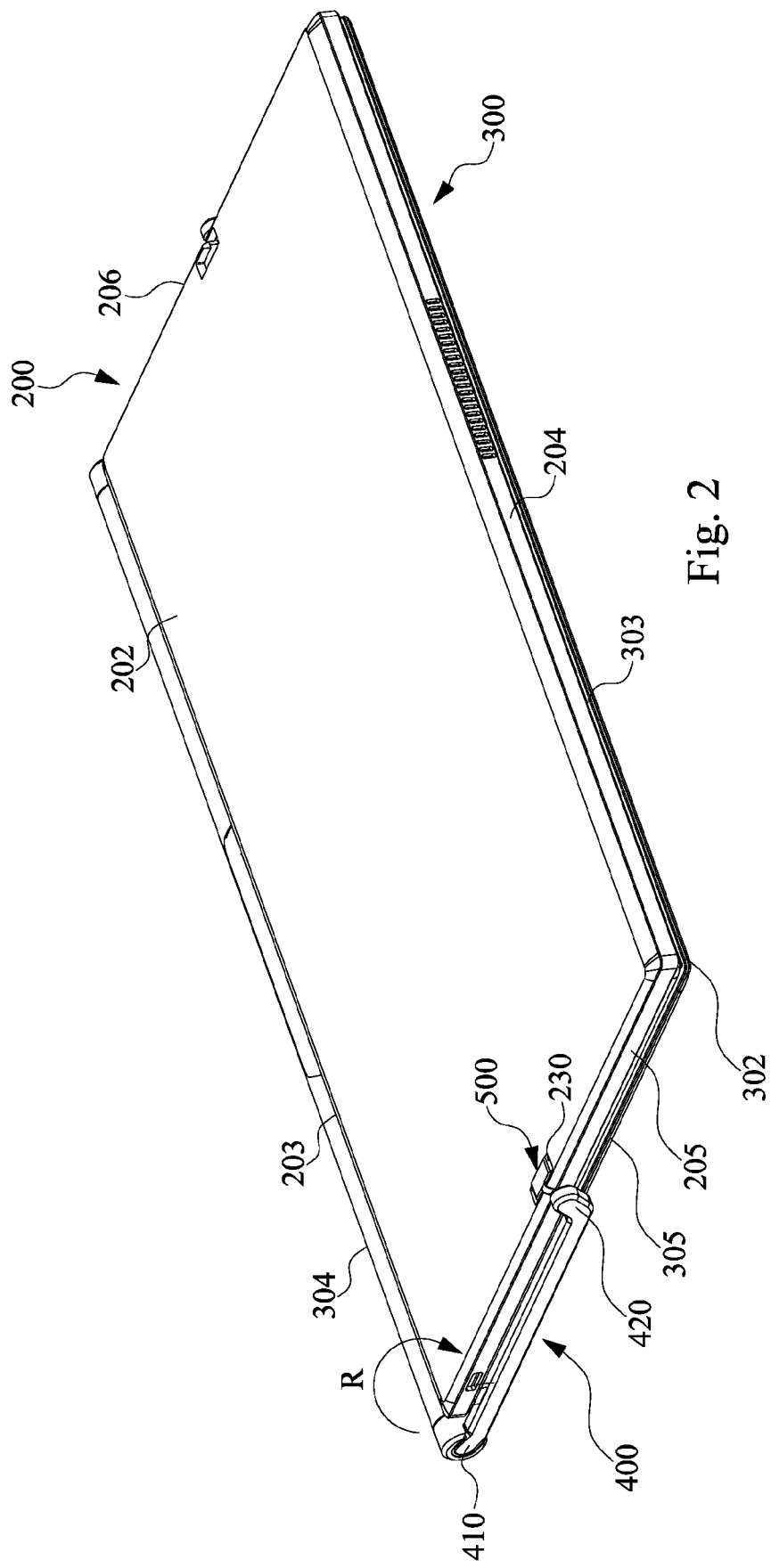
FIG. 2 illustrates a schematic view of the portable electrical device of the disclosure in a first closing state.

Reference is made to FIGS. 1 and 2. FIG. 1 illustrates a schematic view of a portable electrical device 100 of the disclosure in an unfolding state according to an embodiment. FIG. 2 illustrates a schematic view of the portable electrical device 100 of the disclosure in a closing state.

In an embodiment of the disclosure, such a portable electrical device 100 at least includes a tablet PC 200, a bottom plate 300, two support arms 400 and two pivot portions 500.

The tablet PC 200, for example, can be a rectangular plate with a uniform thickness or a wedge-shaped plate with a thickness from thickest to thinnest. The tablet PC 200 has a front surface 201 and a back surface 202 opposite to each other and four side surfaces surrounding the front surface 201 and the back surface 202 of the tablet PC 200. An area of the front surface 201 or the back surface 202 of the tablet PC 200 is greater than that of a side surface and the front surface 201 of the tablet PC 200 has a touch screen 220. In the embodiment, these side surfaces of the tablet PC 200 can include a first long side surface 203 and a second long side surface 204 opposite to each other and a first short side surface 205 and a second short side surface 206 opposite to each other. The first short side surface 205 and the second short side surface 206 both are adjacent between the first long side surface 203 and the second long side surface 204.

The tablet PC 200 has a shell body which includes, for example, a main board, a CPU, a memory unit, a touch input display panel (i.e., the above-mentioned touch screen 220), a hard disk, a battery unit and an electronic component which can make a computer perform work. However, the disclosure is not limited to this.

The bottom plate 300, for example, can be a rectangular or wedge-shaped plate shell. The bottom plate 300 has a front surface 301 and a back surface 302 opposite to each other and four side surfaces surrounding the front surface 301 and the back surface 302 of the bottom plate 300. An area of the front surface 301 or the back surface 302 is greater than that of a side surface and the front surface 301 of the bottom plate 300 is used to carry the tablet PC 200, at least including an input interface 350 (such as the keyboard module, the touch screen 220, a touch plate or a dragging plate). When the input interface 350 is a keyboard module, compared to the input interface 350 as the touch screen 220, the touch plate or the dragging plate, users can sense a feedback of press keys through the input of the keyboard module so that the input convenience is improved. In the embodiment, these side surfaces of the bottom plate 300 can be a front side surface 303 and a back side surface 304 opposite to each other and a left side surface 305 and a right side surface 306 opposite to each other. The front side surface 303 and the back side surface 304 both are adjacent between the left side surface 305 and the right side surface 306. The input interface 350 (the keyboard module as shown) is configured in a position on the front surface 301 of the bottom plate 300 adjacent to the front side surface 303.

Each support arm 400, such as a connecting rod, has a first end 410 and a second end 420 opposite to each other. The first end 410 of each support arm 400 is pivoted to one end of the left side surface 305 or the right side surface 306 of the bottom plate 300 adjacent to the back side surface 304. The second end 420 of each support arm 400 is pivoted to the first short side surface 205 or the second short side surface 206 of the tablet PC 200. For example, the second end 420 of each support arm 400 is pivoted to a middle point of the first short side surface 205 or the second short side surface 206 of the tablet PC 200.

Figure 3:
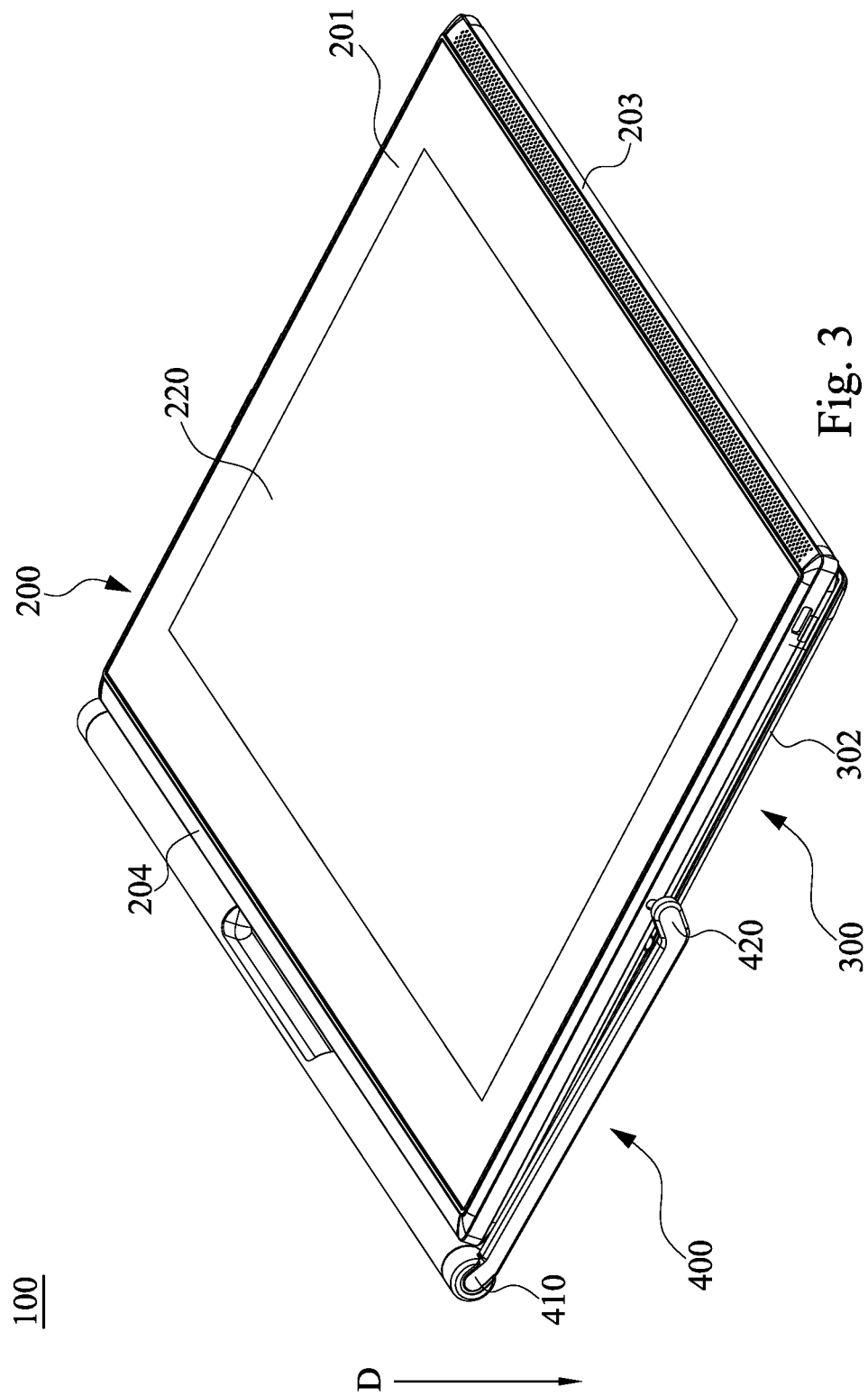
FIG. 3 illustrates a schematic view of the portable electrical device of the disclosure in a second closing state.

Reference is now made to FIGS. 1 to 3. FIG. 3 illustrates a schematic view of the portable electrical device 100 of the disclosure in a second closing state.

In such a way, by the rotation of each support arm 400, the tablet PC 200 can be erected on the front surface 301 of the bottom plate 300 by the first long side surface 203 for users to use the touch screen 220 and the input interface 350 (the keyboard module as shown) at the same time. At this time, the state of the portable electrical device 100 can be referred to as an unfolding state (FIG. 1). Alternatively, by the rotation of each support arm 400, the tablet PC 200 can be covered on the front surface 301 of the bottom plate 300 by the front surface 301 for carrying or receiving and protecting the touch screen 220 of the tablet PC 200 from breaking. At this time, the state of the portable electrical device 100 is referred to as a first closing state (FIG. 2). Additionally, by the rotation of each support arm 400, the tablet PC 200 can be covered on the front surface 301 of the bottom plate 300 by the back surface 202 for using the touch screen 220 of the tablet PC 200. At this time, the state of the portable electrical device 100 is referred to as a second closing state (FIG. 3).

Figure 4A:
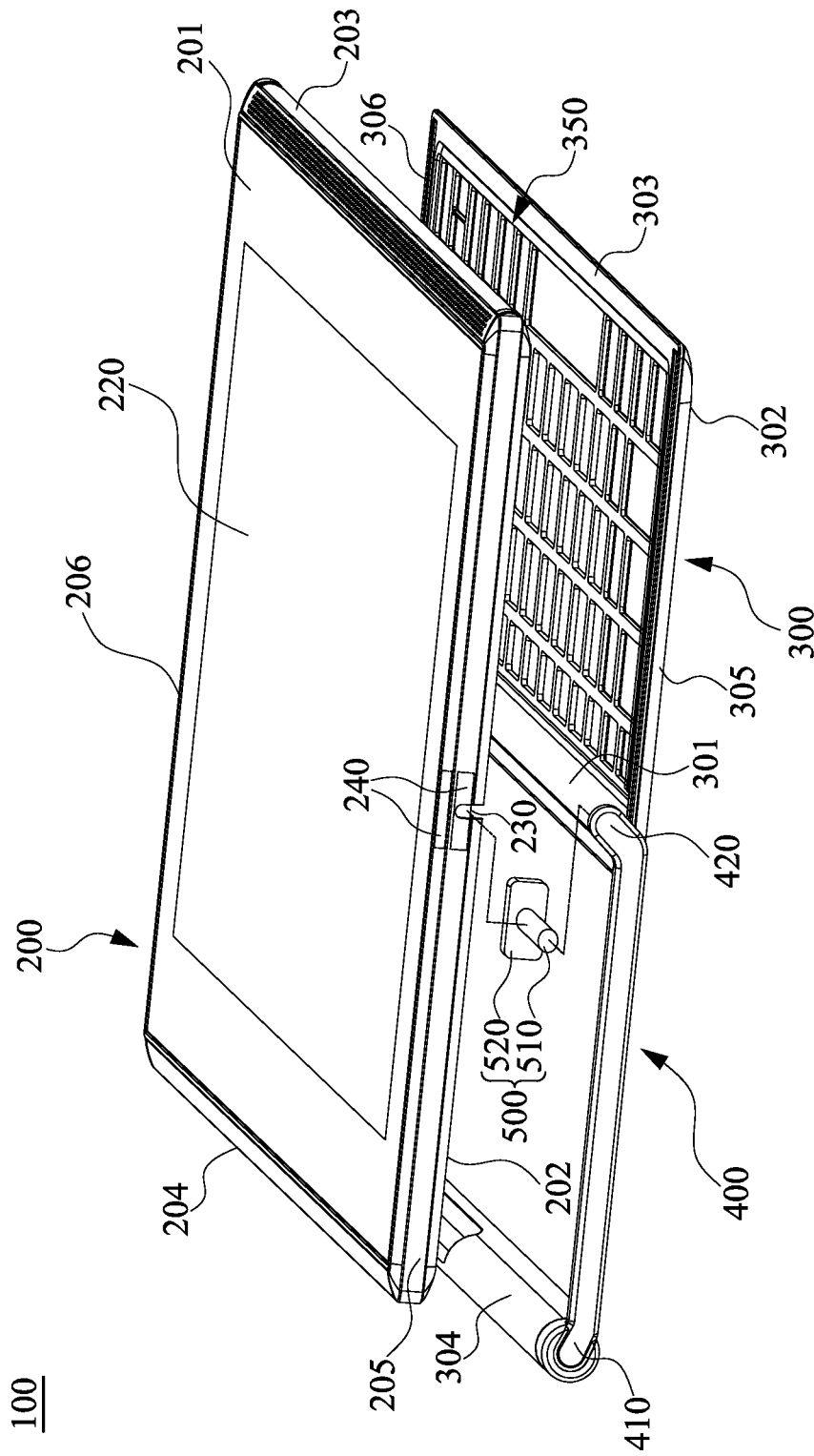
FIG. 4A illustrates a decomposition schematic view of the portable electrical device of the disclosure.
Figure 4B:
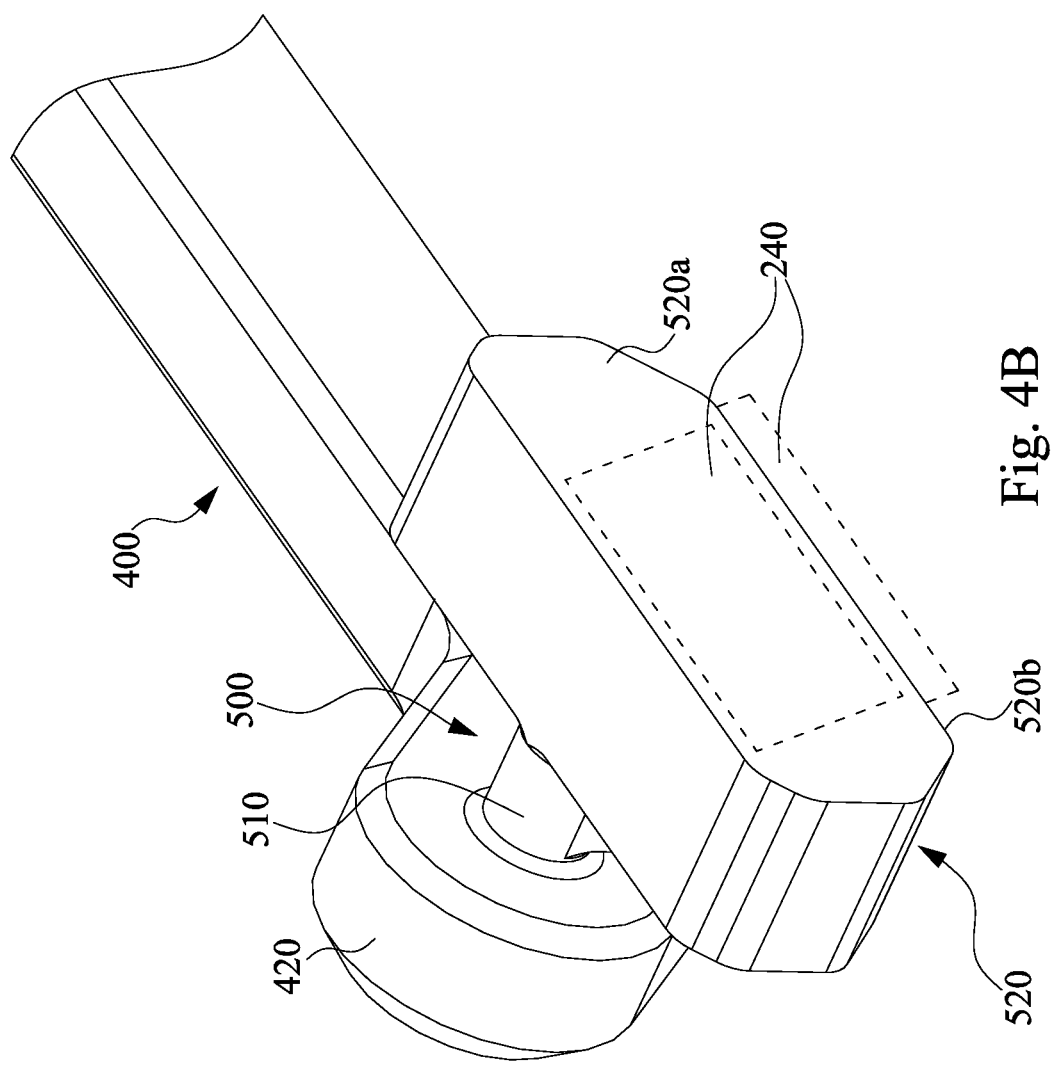
FIG. 4B illustrates an enlargement schematic view of the pivot portion of the portable electrical device of the disclosure.

Reference is now made to FIGS. 2 to 4B. FIG. 4A illustrates a decomposition schematic view of the portable electrical device 100 of the disclosure. FIG. 4B illustrates an enlargement schematic view of the pivot portion 500 of the portable electrical device 100 of the disclosure.

The tablet PC 200 further includes two breaches 230 opposite to each other and two first magnetic inducing members 240. Each breach 230 is configured on both two adjacent external surfaces (FIG. 2) of the tablet PC 200, i.e., the back surface 202 and the first short side surface 205 (or the second short side surface 206) of the tablet PC 200. Each first magnetic inducing member 240 is configured adjacent to a breach 230 in the tablet PC 200.

Each pivot portion 500 includes an axis body 510 and a second magnetic inducing member 520 in a shape of solid block. One end of the axis body 510 is inserted in the second end 420 of the support arm 400 and the other end of the axis body 510 is connected to the second magnetic inducing member 520. Therefore, each pivot portion 500 can be rotated relative to the support arm 400.

When the second magnetic inducing member 520 is moved into the tablet PC 200 through the breach 230 of the back surface 202 of the tablet PC 200 and the axis body 510 is placed into the breach 230 of the first short side surface 205 (or the second short side surface 206) of the tablet PC 200, at least one surface 520a of the second magnetic inducing member 520 can magnetize the first magnetic inducing member 240 mutually, so that the tablet PC 200 is securely coupled with the pivot portion 500 for the tablet PC 200 to be rotated relative to the support arm 400 and the above-mentioned unfolding state, first closing state or second closing state are performed.

As shown in FIG. 3, when the tablet PC 200 is separated from the bottom plate 300, at first, the portable electrical device 100 is placed into the second closing state. That is, the tablet PC 200 is covered on the front surface 301 of the bottom plate 300 to expose the touch screen 220. Then, the support arm 400 is pushed down in a direction D towards the back surface 302 from the front surface 301 of the bottom plate 300, so that the second magnetic inducing member 520 of the pivot portion 500 is separated from the first magnetic inducing member 240 and is removed from the breach 230 of the tablet PC 200 towards the direction D of the bottom plate 300. In such a way, the tablet PC 200 is not securely coupled with the pivot portion 500 for the tablet PC 200 to be separated from the bottom plate 300 totally and the advantage of independent use of the tablet PC 200 is recovered so as to increase users' using motivation and purchase desire.

On the contrary, as shown in FIG. 2, when the tablet PC 200 is combined with the bottom plate 300, at first, the portable electrical device 100 is placed into the first closing state. That is, the tablet PC 200 is covered on the front surface 301 of the bottom plate 300 by the front surface 201. Then, the support arm 400 is rotated towards a rotation direction R to the back surface 202 of the tablet PC 200, so that after the second magnetic inducing member 520 of the pivot portion 500 is moved into the breach 230 of the tablet PC 200 the second magnetic inducing member 520 magnetizes the first magnetic inducing member 240 mutually so that the tablet PC 200 is securely coupled with the pivot portion 500.

In an alternative of the embodiment, two mutual orthogonal first magnetic inducing members 240 can be configured adjacent to each breach 230 in the tablet PC 200 (as shown in FIG. 4B). The two mutual orthogonal first magnetic inducing members 240 can magnetize two adjacent surfaces 520a and 520b of the second magnetic inducing member 520 respectively so that the pivot portion 520 can be configured in each breach 230 more securely.

Referring to FIGS. 1 and 5A again, FIG. 5A illustrates a partial enlargement schematic view of an area M of FIG. 1.

The bottom plate 300 further includes two third magnetic inducing members 310. The two third magnetic inducing members 310 are strip-shaped and are configured on the front surface 301 of the bottom plate 300 respectively adjacent to the left side surface 305 and the right side surface 306 of the bottom plate 300, i.e., on two opposite sides of the input interface 350. In addition, the two third magnetic inducing members 310 extend from the front side surface 303 to the back side surface 304 respectively and are parallel to a long axis direction A1 of the left side surface 305 or the right side surface 306.

The tablet PC 200 further includes one or two fourth magnetic inducing members 210. The fourth magnetic inducing members 210 are configured in all positions or two opposite positions of the first long side surface 203 of the tablet PC 200. Each fourth magnetic inducing member 210 magnetizes the third magnetic inducing members 310 mutually.

In such a way, when the portable electrical device 100 is in the unfolding state so that the tablet PC 200 is erected on the front surface 301 of the bottom plate 300 by the first long side surface 203, by the mutual magnetization between the fourth magnetic inducing members 210 and the third magnetic inducing members 310, the tablet PC 200 can be remained on a path of the third magnetic inducing members 310 at random and a tilting angle of the tablet PC 200 on the bottom plate 300 can be chosen at random to provide users more selections of viewing angle.

In addition, in order to prevent the input interface 350 from being worn by the first long side surface 203 of the tablet PC 200 from time to time, a top surface of the fourth magnetic inducing member 210 is designed to be higher than a top surface of the input interface 350. For example, the input interface 350 is concave or the fourth magnetic inducing members 210 are convex so that when the first long side surface 203 of the tablet PC 200 slides on the front surface 301 of the bottom plate 300, only the fourth magnetic inducing members 210 are contacted, without contacting the input interface 350.

Figure 5A:
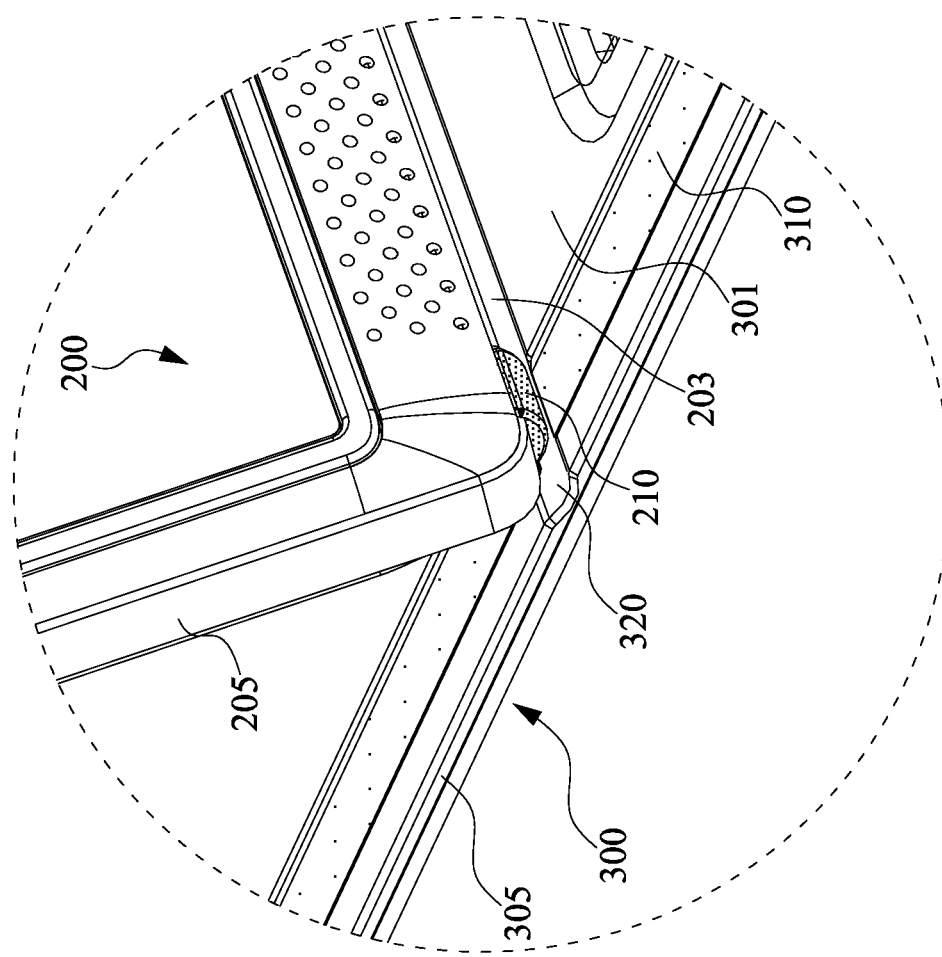
FIG. 5A illustrates a partial enlargement schematic view of an area M of FIG. 1.

FIGS. 1 and 5A are referred to again. In another alternative of the embodiment, the bottom plate 300 further includes an accommodation groove 320. The accommodation groove 320 is configured on the front surface 301 of the bottom plate 300 laterally between the input interface 350 (such as the keyboard module) and the back side surface 304 of the bottom plate 300, parallel to a long axis direction A2 of the front side surface 303 or the back side surface 304 of the bottom plate 300. In other words, the input interface 350 is configured between the front side surface 303 of the bottom plate 300 and the accommodation groove 320.

Moreover, in other variations, the bottom plate 300 also can include multiple accommodation grooves 320 (not shown). These accommodation grooves 320 are configured in parallel between the input interface 350 (such as the keyboard module) and the back side surface 304 of the bottom plate 300 and is parallel to the long axis direction A2 of the back side surface 304 of the bottom plate 300. Designers can adjust the configuration of these accommodation grooves 320 properly according to the elevation angle of the touch screen 220 needed by users.

Figure 5B:
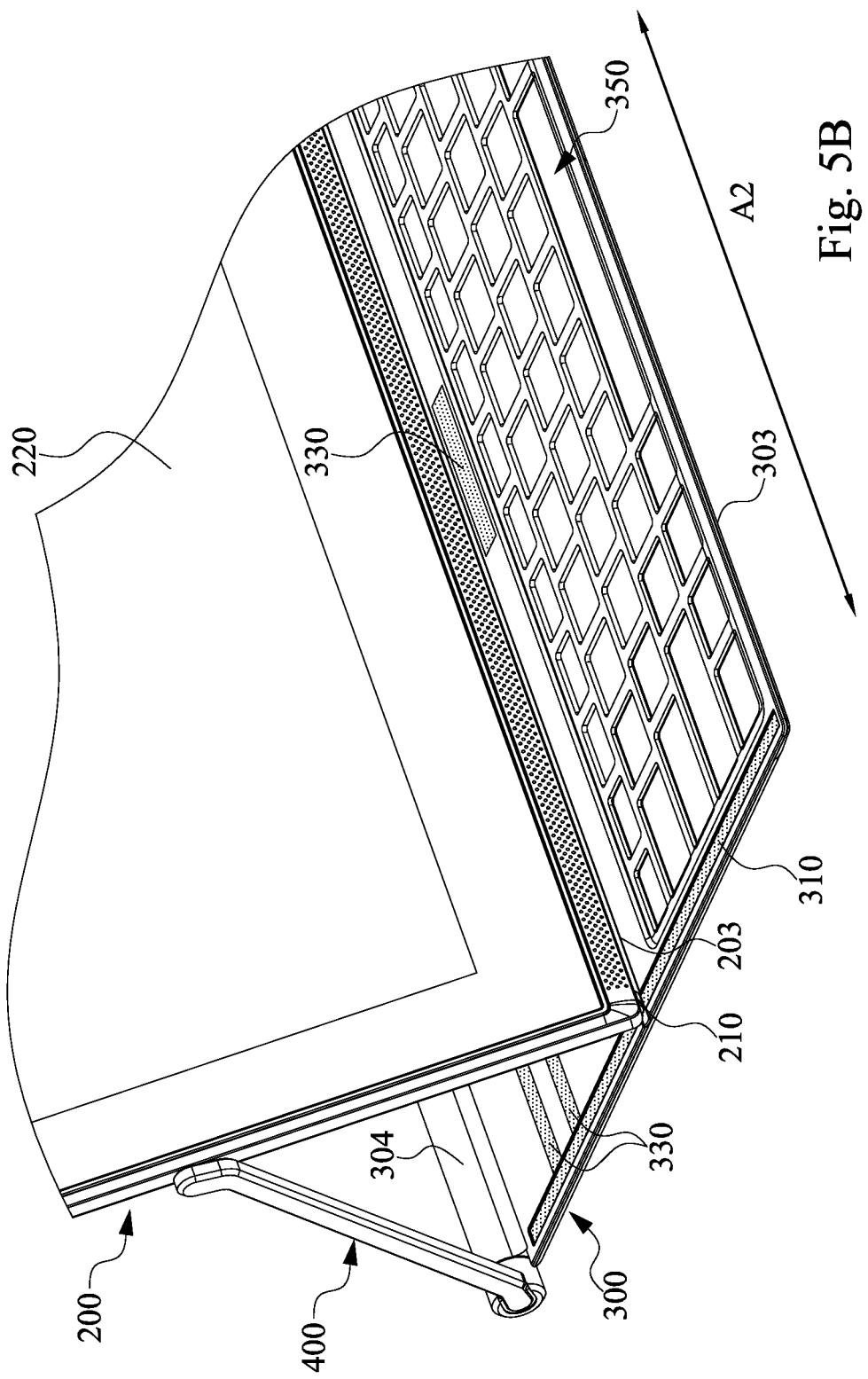
FIG. 5B illustrates a partial enlargement schematic view of the portable electrical device of the disclosure according to another embodiment.

Reference is now made to FIGS. 4B and 5B. FIG. 5B illustrates a partial enlargement schematic view of the portable electrical device 100 of the disclosure according to another embodiment.

In another embodiment, the bottom plate 300 includes multiple fifth magnetic inducing members 330. These fifth magnetic inducing members 330 is configured on the front surface 301 of the bottom plate 300 at intervals in a direction from the front side surface 303 towards the back side surface 304. Preferably, these fifth magnetic inducing members 330 is configured in parallel between the input interface 350 (such as the keyboard module) and the back side surface 304 of the bottom plate 300, parallel to the long axis direction A2 of the back side surface 304 of the bottom plate 300.

In such a way, when the portable electrical device 100 is in the unfolding state so that the tablet PC 200 is erected on the front surface 301 of the bottom plate 300 by the first long side surface 203, by the mutual magnetization between the fourth magnetic inducing members 210 and any fifth magnetic inducing member 330, multiple different included angles exist between the tablet PC 200 and the bottom plate 300. Designers can adjust the configuration of these fifth magnetic inducing members 330 properly according to the elevation angle of the touch screen 220 needed by users.

Referring to FIGS. 1 and 6 again, FIG. 6 illustrates an enlargement schematic view of a first connector module 600 of the portable electrical device 100 of the disclosure.

The tablet PC 200 further includes a first connector module 600. The first connector module 600 includes a contact surface 610, at least one sixth magnetic inducing member 620 and multiple first electrical contacts 630 (such as probe connectors, Pogo Pin or USB connectors). The contact surface 610 is exposed above the first long side surface 203 of the tablet PC 200 or is exposed above the first long side surface 203 of the tablet PC 200 and is adjacent to the back surface 202 of the tablet PC 200. The first electrical contacts 630, such as metal pads, are linearly configured at intervals on the contact surface 610. The first electrical contacts 630 are electrically connected to circuit elements in the tablet PC 200 respectively, such as the above-mentioned main board. Two sixth magnetic inducing members 620 are configured on the contact surface 610 and are on two opposite external sides of these first electrical contacts 630.

Similarly, referring to FIGS. 1 and 7 again, FIG. 7 illustrates an enlargement schematic view of a second connector module 700 of the portable electrical device 100 of the disclosure.

The bottom plate 300 further includes a second connector module 700. The second connector module 700 is configured in an opening 340 on the front surface 301 of the bottom plate 300. The second connector module 700 includes a movable portion 710, at least one seventh magnetic inducing member 720 and multiple second electrical contacts 730. The movable portion 710 is configured in the opening 340 and faces the opening 340, including two opposite sides 711 and 712. A side 711 of the movable portion 710 is configured in the opening 340 and is pivoted to an immobile part (such as a fixing frame 360) in the bottom plate 300, so that when the movable portion 710 rotated relative to the immobile part 360, the other side 712 of the mobile part 710 can be close to the opening 340 (FIG. 8B) and can be exposed outside the opening 340. The second electrical contacts 730 (such as probe connectors, Pogo Pin or USB connectors), such as metal pads or elastic thimbles, are linearly configured at intervals on a surface of the movable portion 710 facing the opening 340. The second electrical contacts 730 are electrically connected to circuit elements in the bottom plate 300 respectively, such as the above-mentioned input interface 350 (such as the keyboard module). Two seventh magnetic inducing members 720 are configured on a surface of the movable portion 710 facing the opening 340 and are configured on two opposite external sides of these second electrical contacts 730.

In such a way, referring to FIGS. 6 to 8B, FIGS. 8A and 8B illustrates operational schematic views of the portable electrical device 100 of the disclosure.

Figure 6:
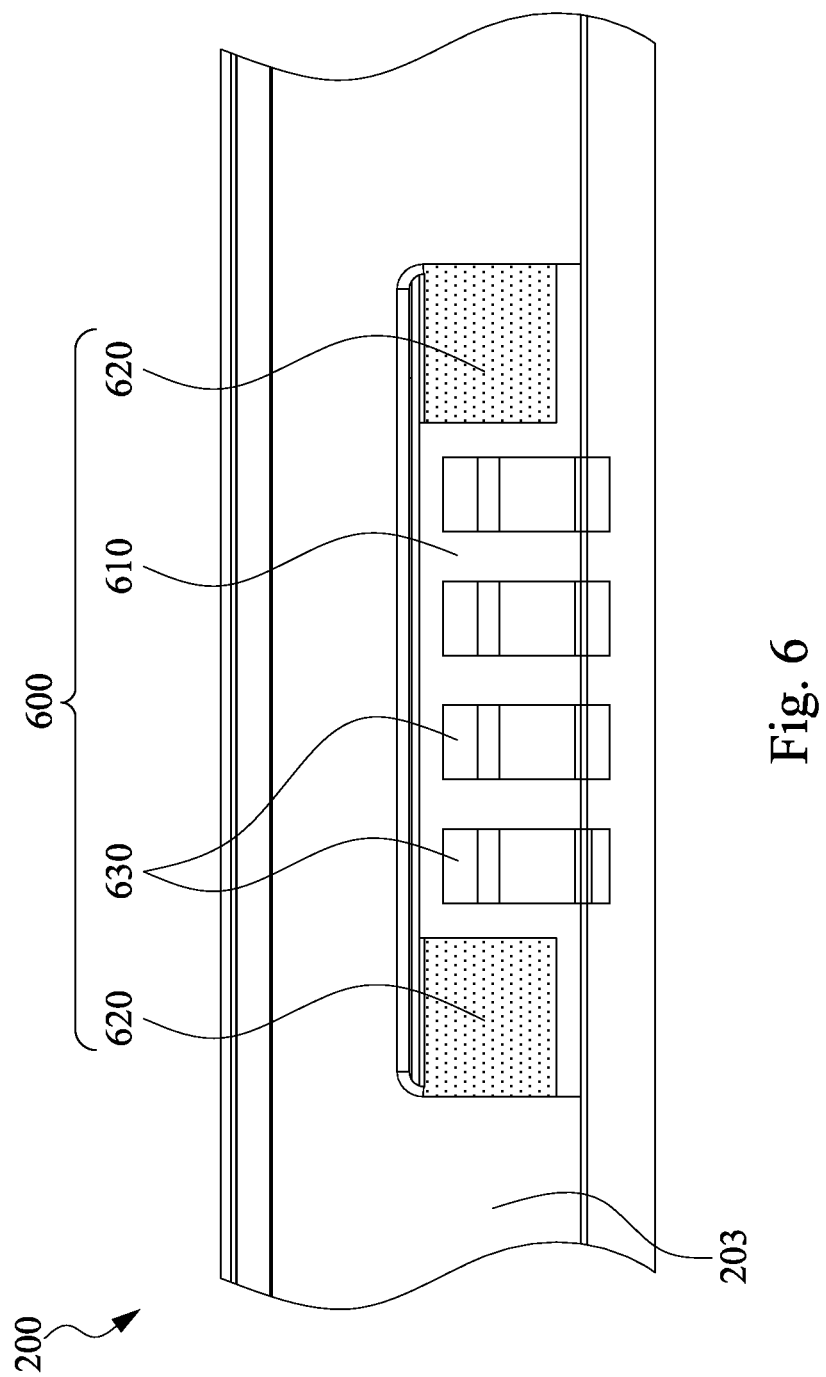
FIG. 6 illustrates an enlargement schematic view of the first connector module of the portable electrical device of the disclosure.

As shown in FIGS. 6 to 8A, when the portable electrical device 100 is in the unfolding state and the first long side surface 203 of the tablet PC 200 does not reach contacting the opening 340, the movable portion 710 of the second connector module 700 shows a force-free state at this time and is configured in the opening 340 entirely. On the contrary, as shown in FIGS. 6, 7 and 8B, when the portable electrical device 100 is in the unfolding state and the tablet PC 200 reaches contacting the opening 340 by the first long side surface 203, since the contact surface 610 and the opening 340 are configured correspondingly, by the mutual magnetization between the sixth magnetic inducing members 620 and the seventh magnetic inducing members 720, the other side 712 of the movable portion 710 is moved with the seventh magnetic inducing members 720 to approach to or expose the opening 340, so that the second electrical contacts 730 are physically and electrically connected to the first electrical contacts 630, thereby realizing the electrical connection between the tablet PC 200 and circuit elements in the bottom plate 300, such as the above-mentioned input interface 350 (such as the keyboard module).

Moreover, the second connector module 700 further includes an elastic element 740. The elastic element 740 is connected to the movable portion 710 and the immobile part 360 (such as the fixing frame) in the bottom plate 300. A resume elasticity of the elastic element 740 for the movable portion 710 is smaller than the magnetization force between the sixth magnetic inducing members 620 and seventh magnetic inducing members 720.

In such a way, when the portable electrical device 100 is in the unfolding state and the first long side surface 203 of the tablet PC 200 is removed from the opening 340, since the sixth magnetic inducing members 620 do not magnetize the seventh magnetic inducing members 720 any more, the elastic element 740 brings the movable portion 710 into the opening 340 so that the second electrical contacts 730 are removed from the first electrical contacts 630, thereby stopping the electrical connection between the tablet PC 200 and circuit elements in the bottom plate 300, such as the above-mentioned input interface 350 (such as the keyboard module).

However, the disclosure is not limited to this. A signal cable of the bottom plate 300 also can be connected to the tablet PC 200 through a support arm 400 (not shown). Alternatively, the tablet PC 200 and the input interface 350 (such as the keyboard module) of the bottom plate 300 can be electrically connected by a wireless manner (such as a bluetooth protocol).

It should be defined that, one of the above-mentioned first magnetic inducing member 240 and the second magnetic inducing member 520, one of the third magnetic inducing member 310 and the fourth magnetic inducing member 210, one of the third magnetic inducing member 310 and the fifth magnetic inducing member 330 and one of the sixth magnetic inducing member 620 and the seventh magnetic inducing member 720 are needed to be magnet members. The other one of the above-mentioned first magnetic inducing member 240 and the second magnetic inducing member 520, the other one of the third magnetic inducing member 310 and the fourth magnetic inducing member 210, the other one of the third magnetic inducing member 310 and the fifth magnetic inducing member 330 and the other one of the sixth magnetic inducing member 620 and the seventh magnetic inducing member 720 are needed to be magnet members or metal members which can be magnetized. Magnet members, for example, are permanent magnets (such as loadstones) and non-permanent magnets (such as electromagnets). The metal members are, for example, steel, iron, cobalt, nickel, copper, zinc and so on; or the alloys of the above-mentioned metals; or the plated metals described above and so on.

In view of the above, by the design of the portable electrical device 100 of the disclosure, the portable electrical device 100 can provide the advantage of the tablet PC 200 which is pivoted to the bottom plate 300 (such as the keyboard module) relatively and the advantage of the independent use of the tablet PC 200 respectively so as to increase users' using motivation and purchase desire.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable electrical device, comprising:
   a tablet PC comprising:
      a breach;
      at least one first magnetic inducing member arranged inside the breach; and
      a first connector module configured on a side surface of the tablet PC, the first connector module comprising at least one sixth magnetic inducing member and at least one first electrical contact, the first electrical contact being electrically connected to the tablet PC;
   a bottom plate comprising:
      an input interface configured on a surface of the bottom plate;
      an opening configured on the surface of the bottom plate; and
      a second connector module configured in the opening, the second connector module comprising:
         a movable portion comprising two opposite sides, one of the two opposite sides of the movable portion being pivoted to the bottom plate;
         at least one seventh magnetic inducing member configured on a surface of the movable portion; and
         at least one second electrical contact configured on the surface of the movable portion and electrically connected to the input interface;
   at least one support arm comprising a first end and a second end opposite to each other, wherein the first end is pivoted to the bottom plate; and
      at least one pivot portion comprising a third end and a fourth end opposite to each other, wherein the third end is pivoted to the second end of the support arm, and the fourth end is provided with a second magnetic inducing member, wherein when the second magnetic inducing member is moved into the breach to magnetize the first magnetic inducing member, the tablet PC is securely coupled with the pivot portion so that the tablet PC can be rotated relative to the support arm, wherein, when the tablet PC is rotated relative to the support arm and thus the side surface of the tablet PC reaches contacting the opening, by a mutual magnetization between the sixth magnetic inducing member and the seventh magnetic inducing member, the other of the two opposite sides of the movable portion is moved with the seventh magnetic inducing member and removed from the opening, such that the second electrical contacts are electrically connected to the first electrical contacts, and wherein when the second magnetic inducing member is removed from the breach, the tablet PC can be totally independent to the support arm.

2. The portable electrical device of claim 1, wherein the second magnetic inducing member comprises two adjacent surfaces respectively magnetizing two of the at least one first magnetic inducing members.

3. The portable electrical device of claim 1, wherein the tablet PC comprises two adjacent external surfaces, and the breach is configured on both of the two external surfaces.

4. The portable electrical device of claim 1, wherein the bottom plate further comprises:

at least one third magnetic inducing member configured on a surface of the bottom plate provided with the input interface, extending from a front side surface to a back side surface opposite to the front side surface; and the tablet PC further comprises:

at least one fourth magnetic inducing member configured on a side surface of the tablet PC, wherein, when the tablet PC is rotated relative to the support arm and thus the side surface of the tablet PC contacts the surface of the bottom plate provided with the input interface, by a mutual magnetization between the fourth magnetic inducing member and the third magnetic inducing member, the tablet PC is erected on the surface of the bottom plate provided with the input interface.

5. The portable electrical device of claim 4, wherein the bottom plate further comprises:

a plurality of fifth magnetic inducing members configured on the surface of the bottom plate provided with the input interface at intervals in a direction from the front side surface towards the back side surface, wherein by the mutual magnetization between the fourth magnetic inducing member and each of the fifth magnetic inducing members, a plurality of different included angles exist between the tablet PC and the bottom plate.

6. The portable electrical device of claim 5, wherein one of the third to fifth magnetic inducing members is one of a magnet member and a metal member capable of being magnetized.

7. The portable electrical device of claim 1, wherein the second connector module further comprises:

an elastic element connecting the movable portion and the bottom plate, wherein when the tablet PC is rotated relative to the support arm and thus the side surface of the tablet PC is apart away from the opening, the elastic element brings the other of the two opposite sides of the movable portion back into the opening.

8. The portable electrical device of claim 1, wherein the bottom plate further comprises:

an accommodation groove configured on a surface of the bottom plate provided with the input interface, for accommodating the side surface of the tablet PC, wherein the opening is configured in the accommodation groove.

9. The portable electrical device of claim 1, wherein one of the first magnetic inducing member and the second magnetic inducing member is one of a magnet member and a metal member capable of being magnetized.

10. The portable electrical device of claim 1, wherein one of the sixth to seventh magnetic inducing members is one of a magnet member and a metal member capable of being magnetized.

* * * * *